(12) United States Patent
Sudo

(10) Patent No.: US 7,633,705 B2
(45) Date of Patent: Dec. 15, 2009

(54) METHOD AND APPARATUS FOR DETERMINING DISK-RUNOUT INFORMATION IN A DISK DRIVE

(75) Inventor: Daisuke Sudo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/245,617

(22) Filed: Oct. 3, 2008

(65) Prior Publication Data

US 2009/0161248 A1 Jun. 25, 2009

(30) Foreign Application Priority Data

Dec. 20, 2007 (JP) .............................. 2007-329074

(51) Int. Cl.
*G11B 5/596* (2006.01)
(52) U.S. Cl. ................................. 360/77.04
(58) Field of Classification Search ........................ None
See application file for complete search history.

(56) References Cited

U.S. PATENT DOCUMENTS

| | | | |
|---|---|---|---|
| 5,444,583 A * | 8/1995 | Ehrlich et al. .................. 360/69 |
| 5,608,586 A * | 3/1997 | Sri-Jayantha et al. .... 360/77.04 |
| 6,188,191 B1 * | 2/2001 | Frees et al. .................... 360/75 |
| 6,611,391 B1 * | 8/2003 | Murphy et al. ................. 360/51 |
| 6,760,183 B2 | 7/2004 | Kusumoto |
| 6,882,487 B2 * | 4/2005 | Hanson et al. ................. 360/51 |
| 7,046,477 B2 | 5/2006 | Shibata |
| 7,057,836 B1 * | 6/2006 | Kupferman .............. 360/77.04 |
| 7,075,746 B1 * | 7/2006 | Kupferman .............. 360/77.08 |
| 2007/0153412 A1 * | 7/2007 | Takeda et al. ................. 360/69 |

FOREIGN PATENT DOCUMENTS

| | | |
|---|---|---|
| JP | H8-315529 A | 11/1996 |
| JP | 3198490 B2 | 6/2001 |

* cited by examiner

*Primary Examiner*—Hoa T Nguyen
*Assistant Examiner*—James L Habermehl
(74) *Attorney, Agent, or Firm*—Knobbe, Martens, Olson & Bear LLP

(57) ABSTRACT

According to one embodiment, a disk drive has a disk, a CPU and a memory. The CPU measures servo intervals between the servo areas provided on the disk, and calculates changes of the servo intervals, which have resulted from a temperature change. The CPU detects a disk shift from the changes of the servo intervals. The CPU updates the disk-runout information stored in the memory, in accordance with the disk shift detected.

23 Claims, 14 Drawing Sheets

| Temperature | Servo-interval change $\Delta SGI$ | Servo-interval phase $P_{SGI}$ |
|---|---|---|
| $T_0 - T_1$ | $A_{11}$ | $A_{12}$ |
| $T_1 - T_2$ | $A_{21}$ | $A_{22}$ |
| $T_2 - T_3$ | $A_{31}$ | $A_{32}$ |
| ⋮ | ⋮ | ⋮ |
| $T_{N-1} - T_N$ | $A_{N1}$ | $A_{N2}$ |

| Disk runout E | $B_1$ |
|---|---|
| Disk-runout phase $P_E$ | $B_2$ |

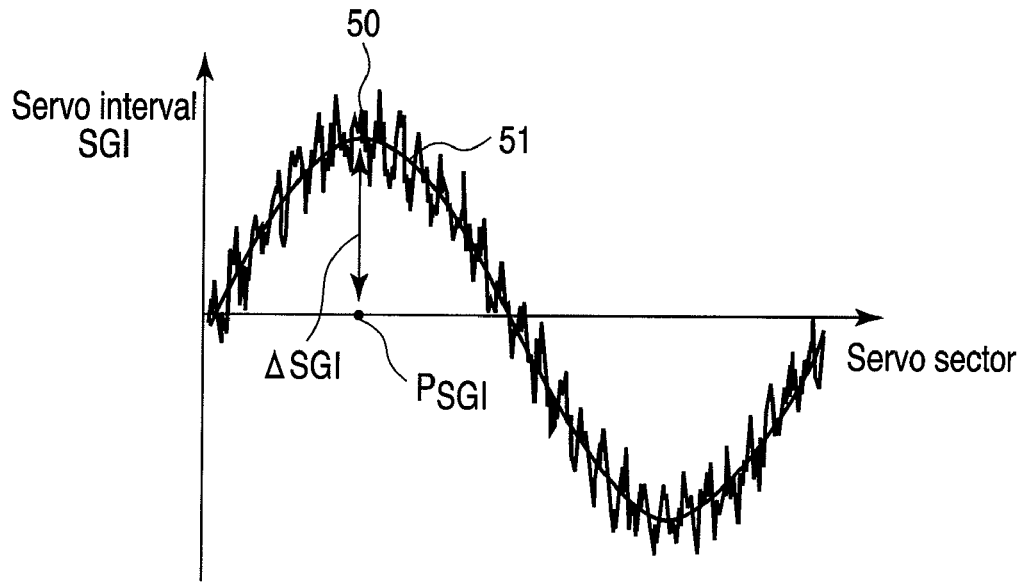
F I G. 5
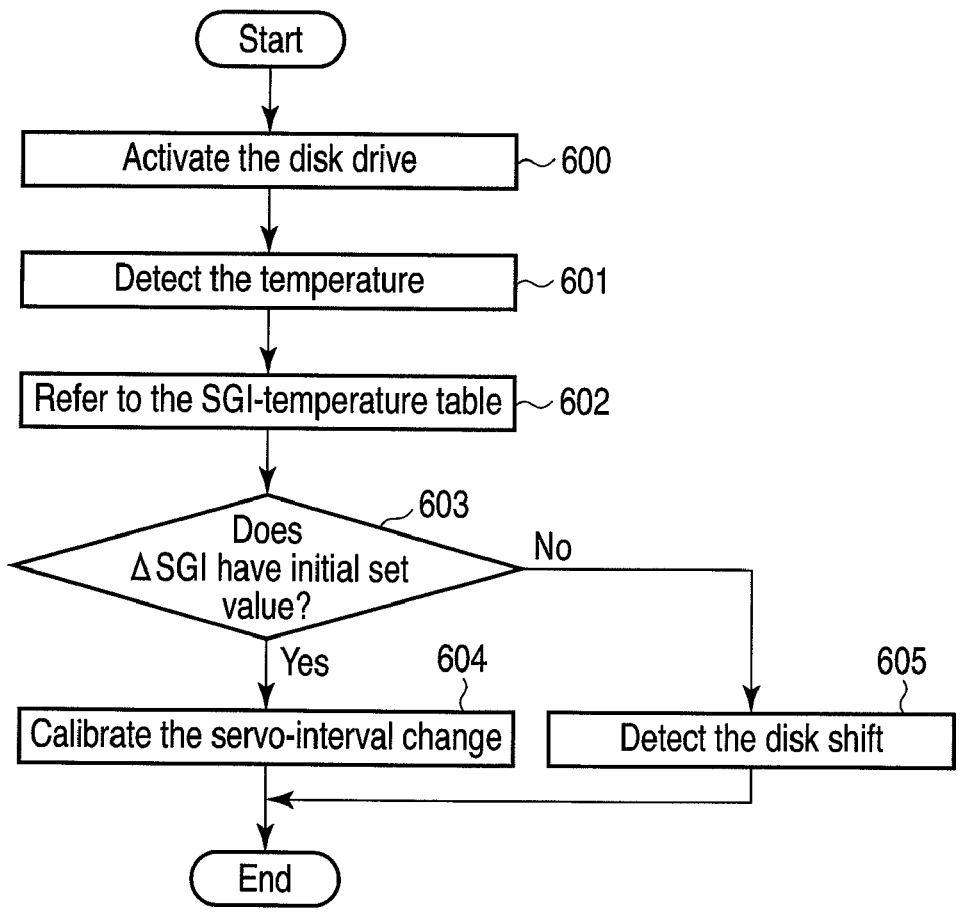
F I G. 6

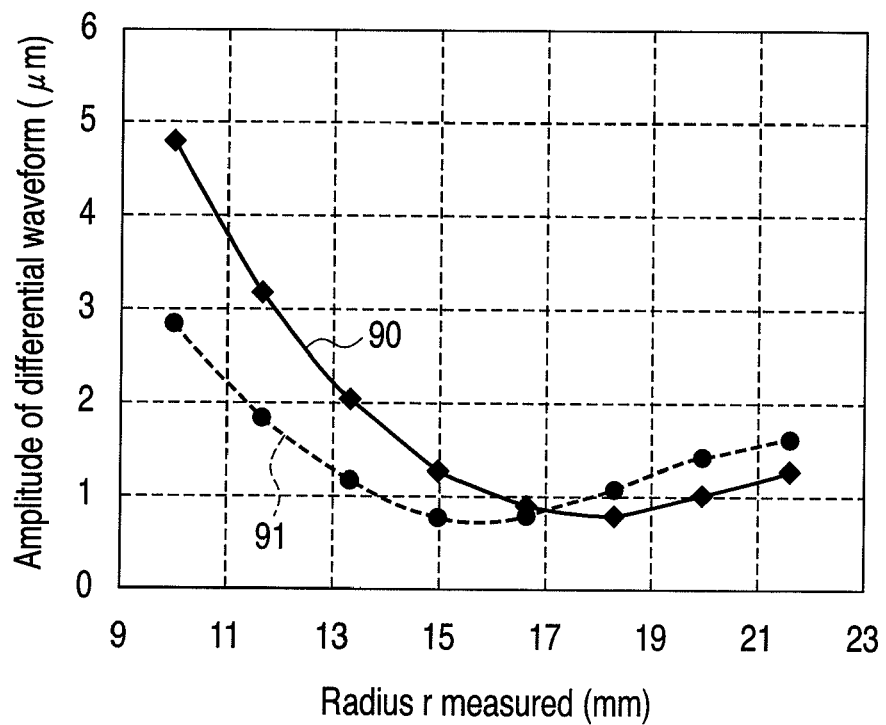
F I G. 9
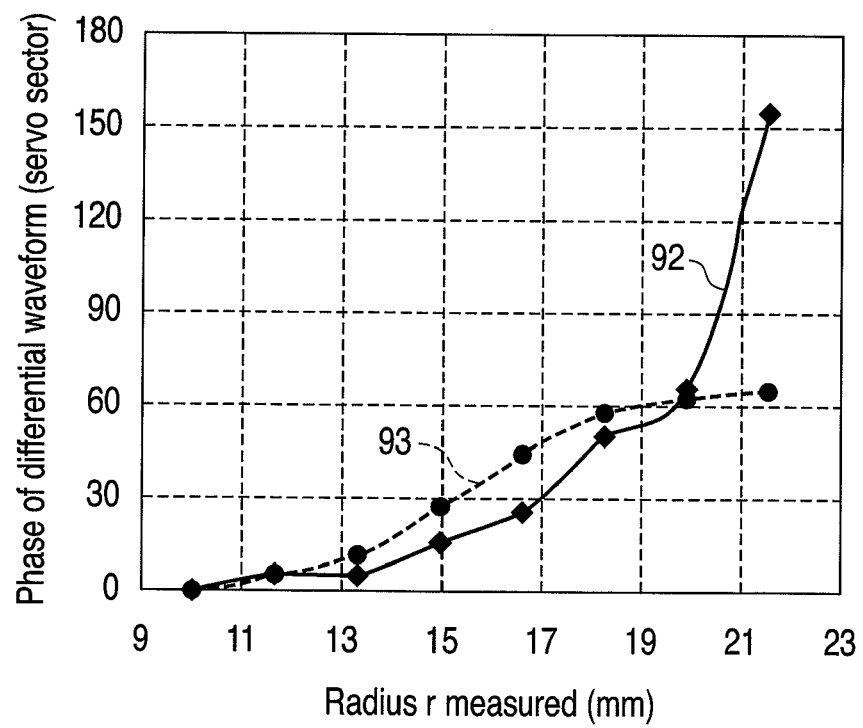
F I G. 10

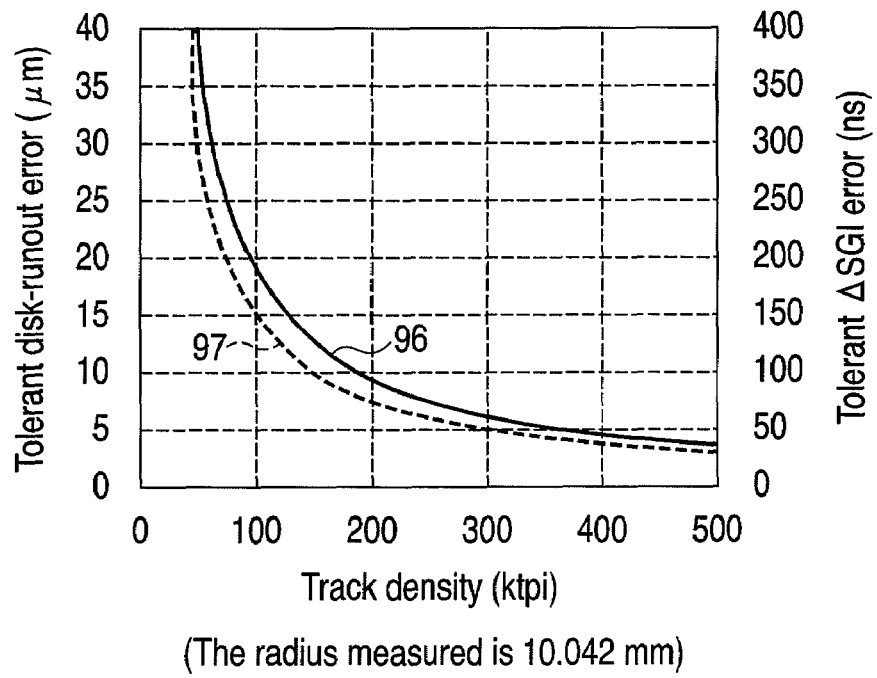
(The radius measured is 10.042 mm)
F I G. 13
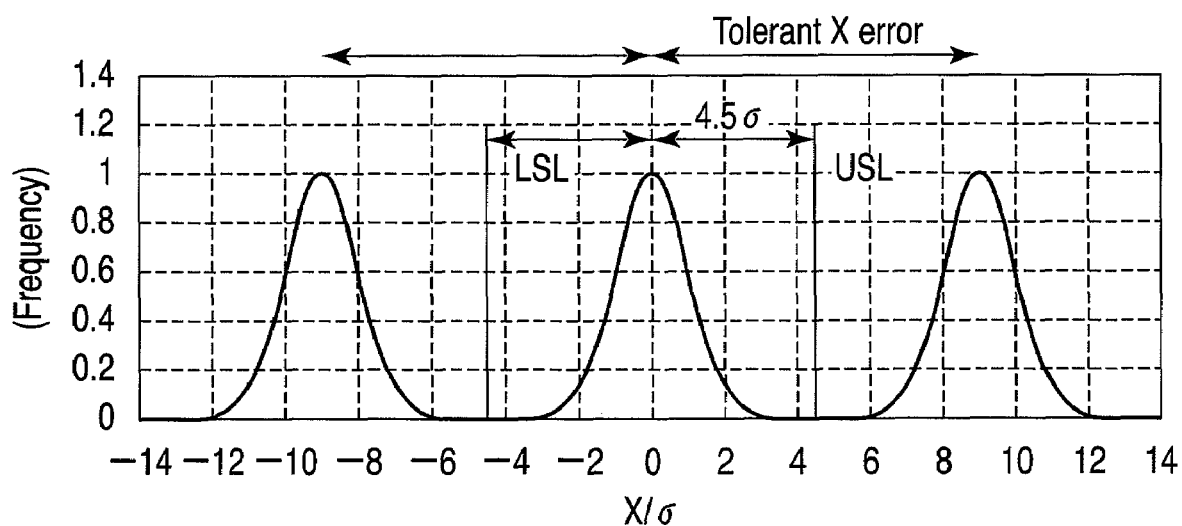
F I G. 14

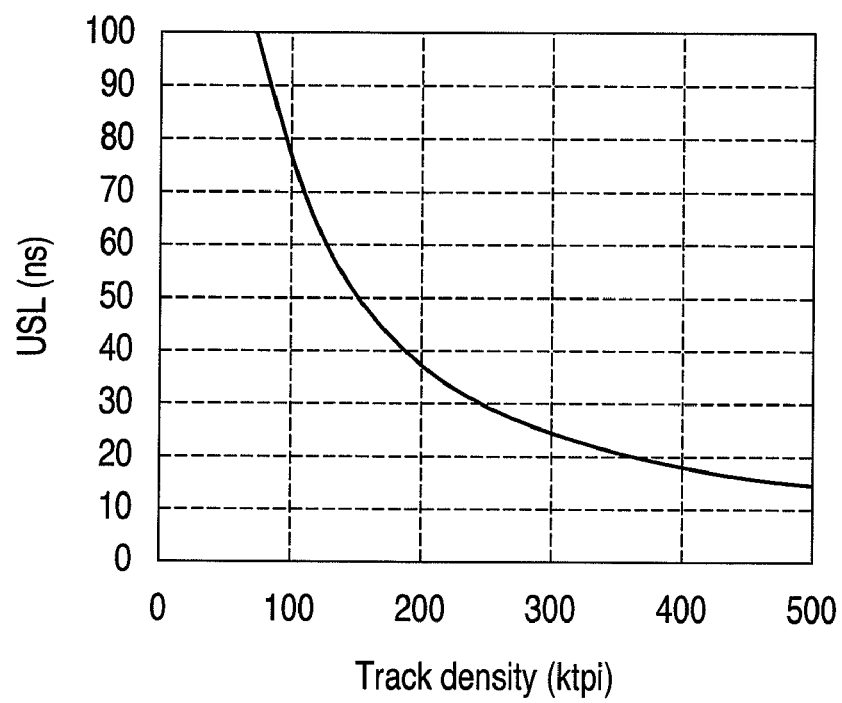
F I G. 15
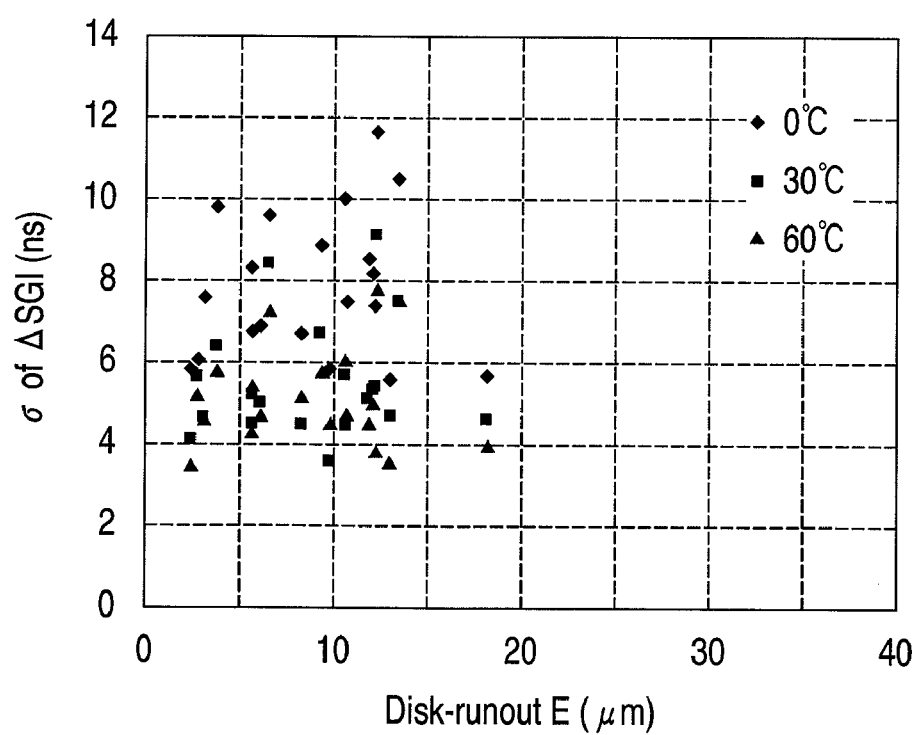
F I G. 16

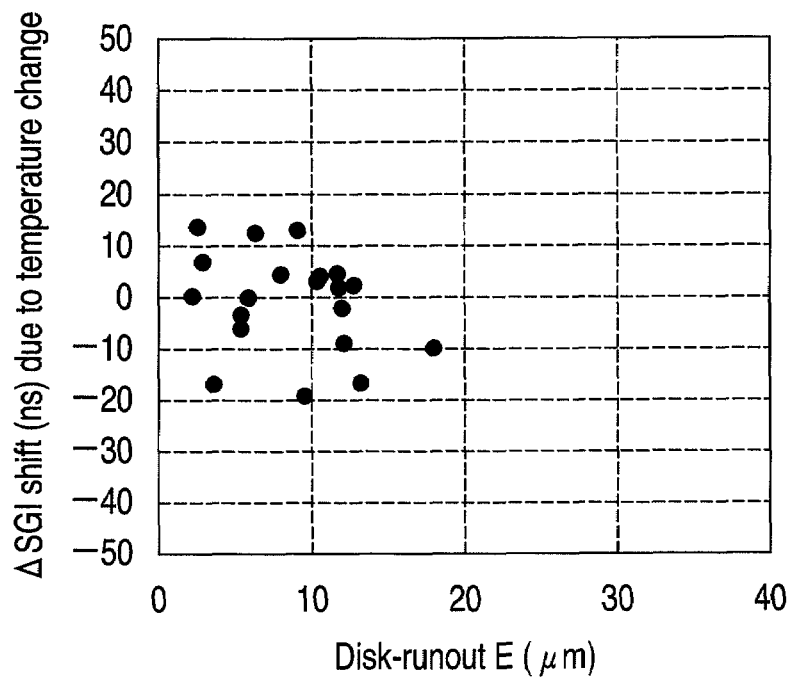
F I G. 17
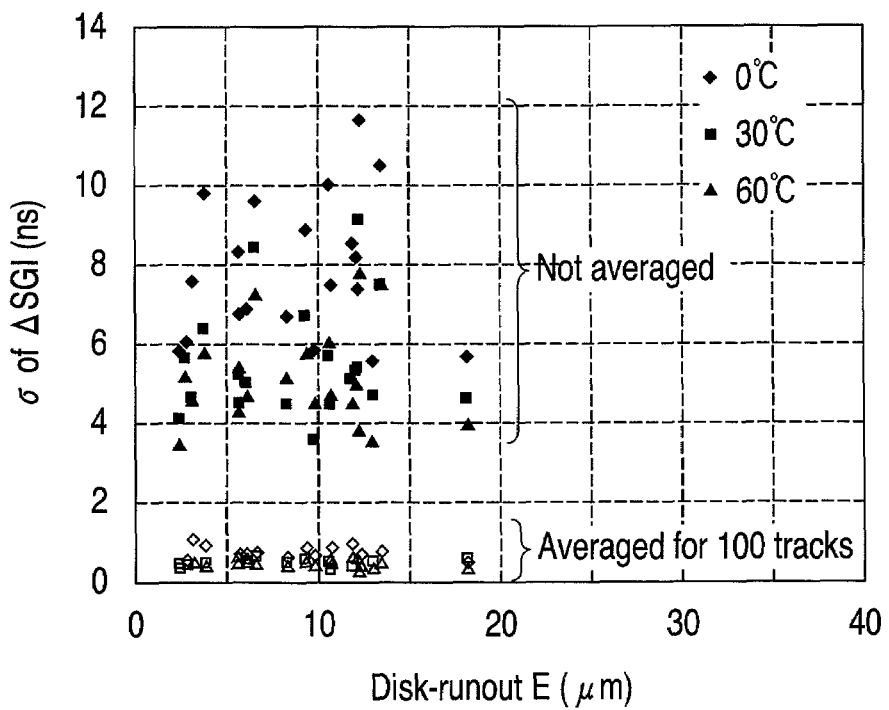
F I G. 18

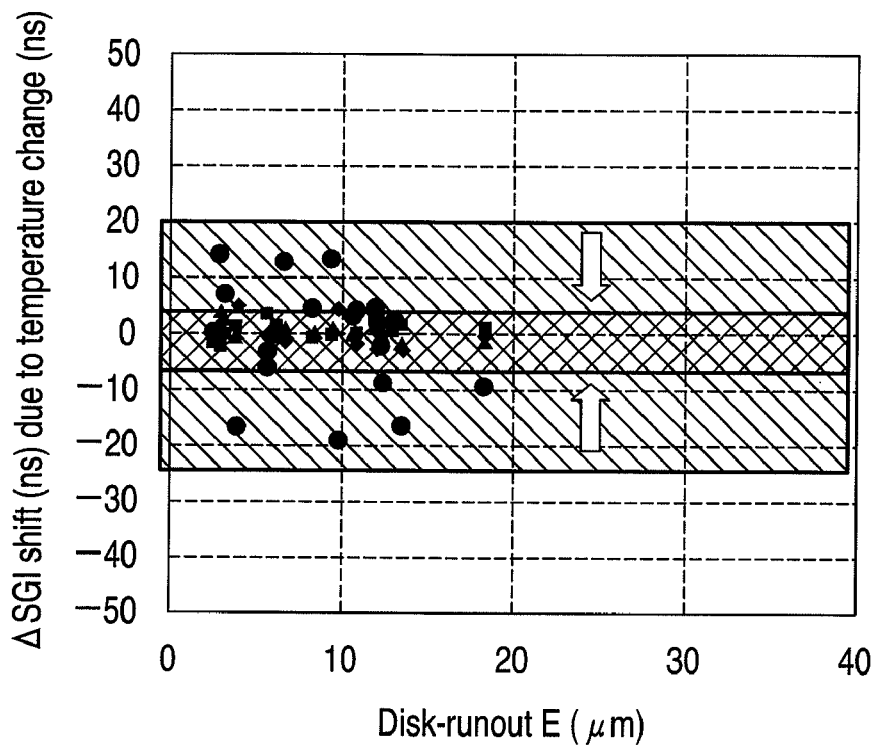
F I G. 19
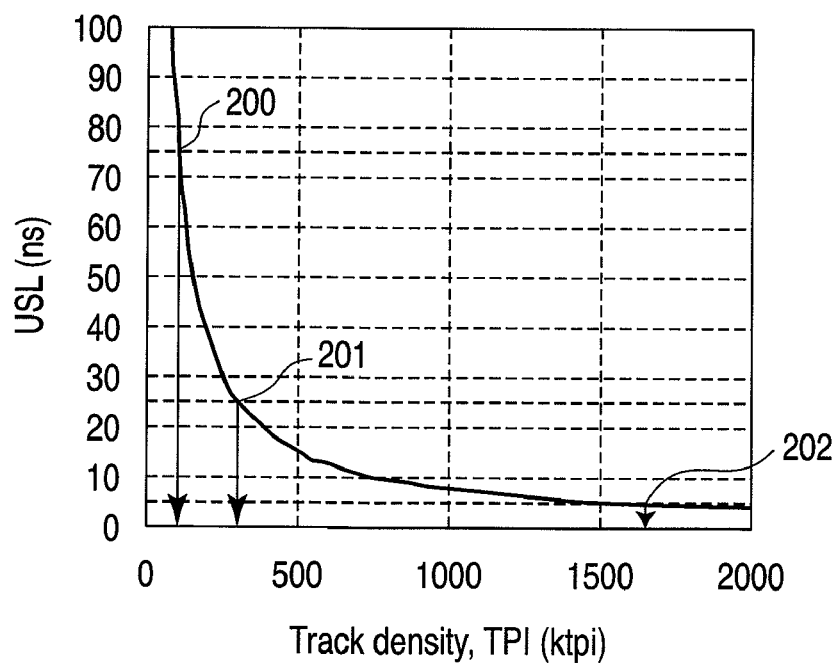
F I G. 20

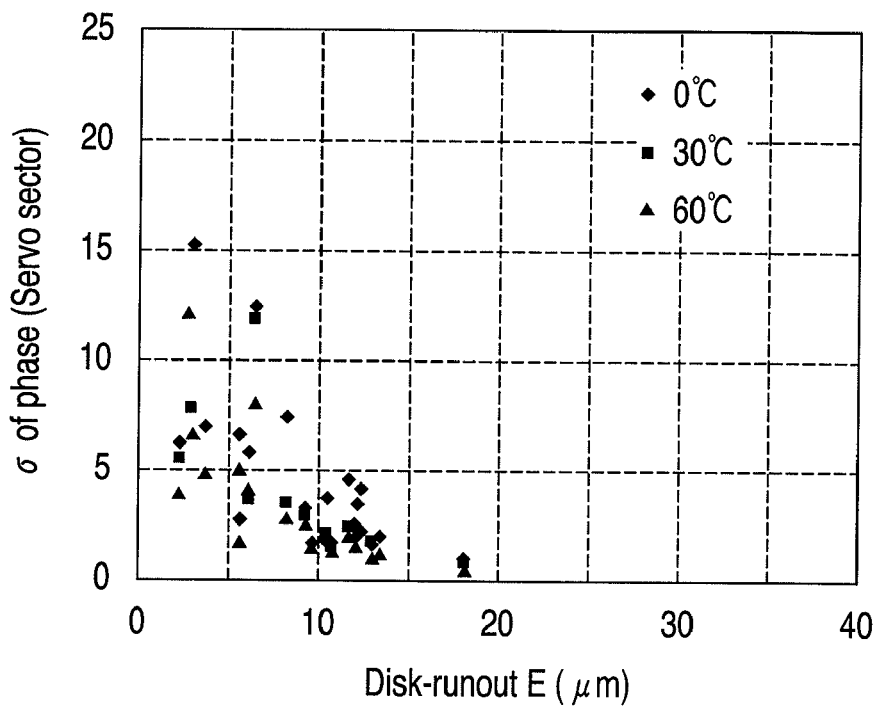
F I G. 21
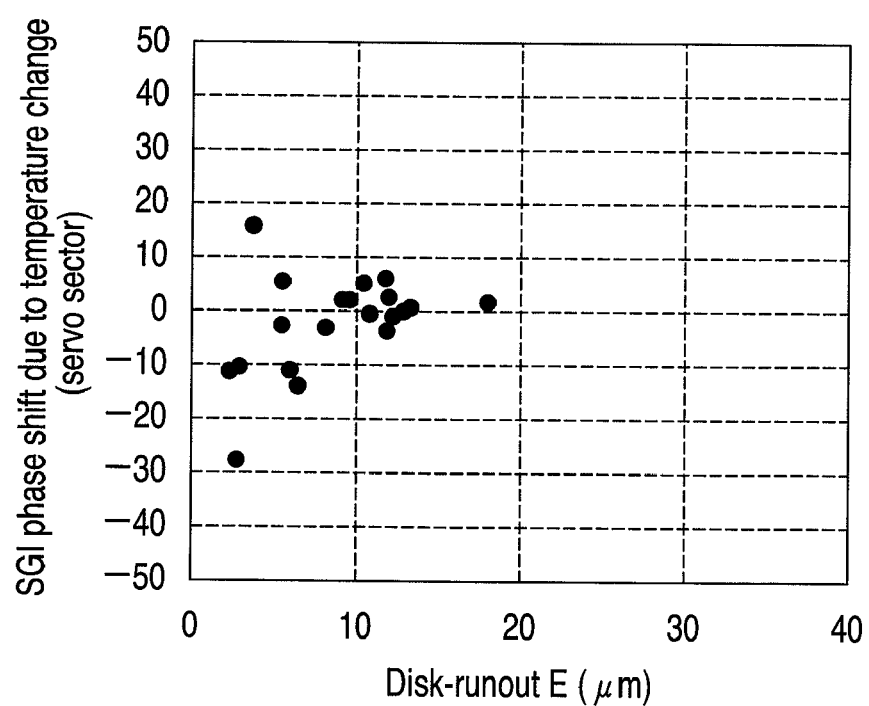
F I G. 22

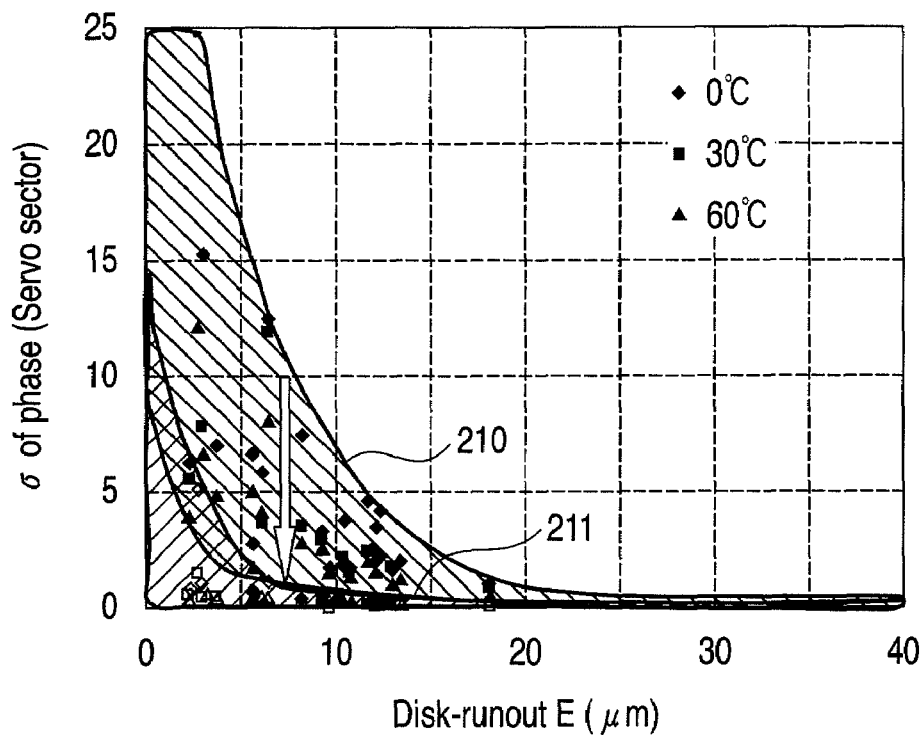
F I G. 23
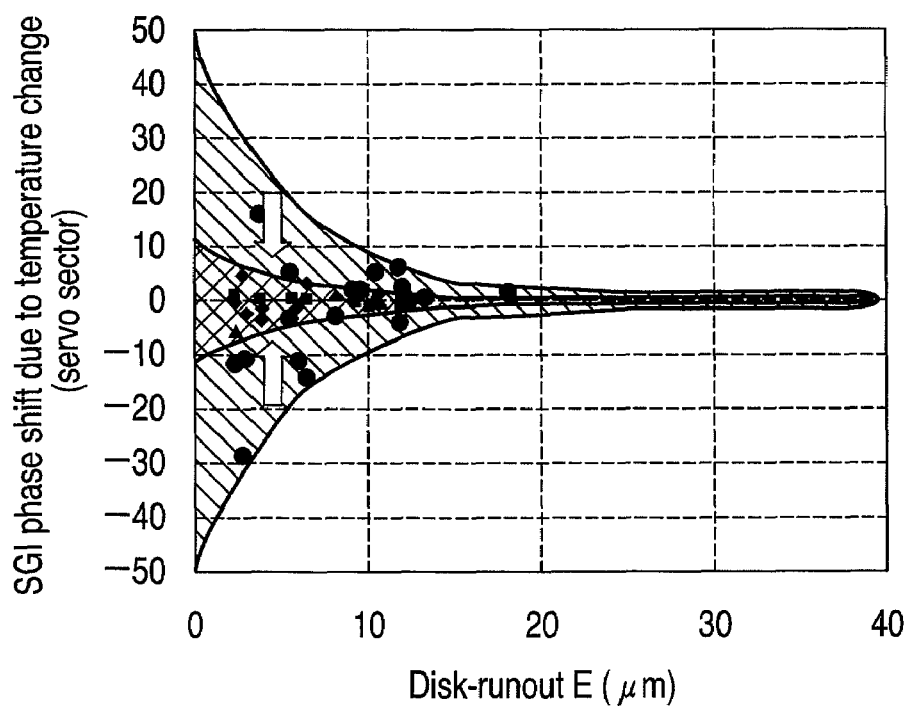
F I G. 24

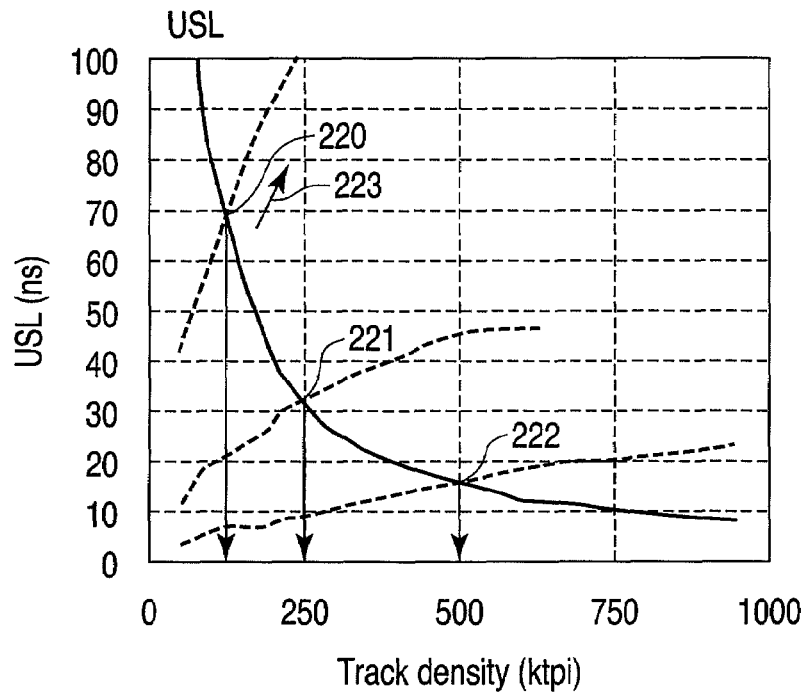
F I G. 25
|  | Highest track density (ktpi) at which the disk runout can be detected | Highest track density (ktpi) at which the disk-runout phase can be detected (ktpi) | Highest track density (ktpi) that can be detected |
|---|---|---|---|
| Default | 100 | 120 | 100 |
| Averaging process | 300 | 245 | 245 |
| Averaging process performed, and SGI-temperature table used | 1700 | 490 | 490 |
F I G. 26

METHOD AND APPARATUS FOR DETERMINING DISK-RUNOUT INFORMATION IN A DISK DRIVE

CROSS-REFERENCE TO RELATED APPLICATIONS

This application is based upon and claims the benefit of priority from Japanese Patent Application No. 2007-329074, filed Dec. 20, 2007, the entire contents of which are incorporated herein by reference.

BACKGROUND

1. Field

One embodiment of the present invention relates to a disk drive. More particularly, the invention relates to a technique of updating the disk-runout information whenever a disk shift occurs in the disk drive.

2. Description of the Related Art

In most disk drives, a representative example of which is the hard disk drive, head-positioning control is performed to move the magnetic head to a target position over the disk (i.e., target track or target cylinder). The magnetic head has a read head and a write head. The read head and write head are mounted on a slider and spaced apart from each other. The read head is configured to read data recorded in the disk. The write head is configured to write data in the disk.

The disk drive has a rotary-type actuator, which holds the magnetic head. When controlled and driven, the actuator moves the magnetic head, positioning the magnetic head at the target position over the disk. More precisely, the write head must be positioned at the target position in order to record data in the disk, and the read head must be positioned at the target position in order to reproduce data from the disk. Since the read head and the write head are located at different positions as described above, the magnetic head must be subjected to position adjustment called "offset" so that it may record and reproduce data reliably.

The position adjustment of the magnetic head is accomplished by using the offset values stored in a memory incorporated in the disk drive. The offset values have been determined from the distance between the read and write heads and from the skew angle of the actuator. (The skew angle changes while the magnetic head is being moved in the radial direction of the disk.)

During the manufacture of the disk drive, so-called "disk runout" develops. The disk runout occurs as the spindle motor rotates the disk. If the disk is eccentric to the shaft of the spindle motor, the physical position the magnetic head has with respect to the same track changes every time the disk rotates 360°. As the physical position of the magnetic head changes, the offset value changes, too.

Any disk drive in which disk runout develops needs to perform so-called dynamic offset control (DOC) function of correcting the offset value by using, as parameters, the absolute value and phase of disk runout with respect to each track provided on the disk. The DOC function can suppress the head-positioning error deriving from the disk runout.

The disk runout is measured during the manufacture of the disk drive and is stored in the memory incorporated in the disk drive. After the disk drive has been shipped, however, a phenomenon called "disk shift" (i.e., shift of the rotation center of the disk) takes place when the disk drive receives an external impact. The disk shift changes the disk runout that should be applied to the DOC function. In view of this, the disk drive should preferably have a function of measuring the disk runout and updating the disk-runout information stored in the internal memory.

For example, Japanese Patent No. 3198490 proposes a method of updating disk-runout information is proposed. In this method, a disk runout is calculated anew from the changes in the interval of the servo data items recorded in the disk (i.e., servo-interval change) and is stored the memory incorporated in the disk drive.

As described above, an accurate disk runout is indispensable to the DOC function in the disk drive. It is therefore important for the disk drive to measure the disk-runout accurately at all times and to update the disk-runout information stored in the internal memory. However, the method disclosed in the above-identified publication cannot calculate accurate disk runouts. This is because the servo-interval change mentioned above is influenced by not only the changes in disk rotation speed, but also by changes in temperature.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is a diagram explaining the servo interval applied in the embodiment and the primary component of the servo interval;

FIG. 6 is a flowchart explaining the sequence of updating the disk-runout information in the embodiment;

FIG. 9 is a diagram explaining a method of removing the disk-rotation component from the servo interval applied to the embodiment;

FIG. 10 is a diagram explaining another method of removing the disk-rotation component from the servo interval applied to the embodiment;

FIG. 13 is a diagram representing the relation that the tolerant disk-runout error and tolerant $\Delta$SGI error have with the track density in the embodiment;

FIG. 14 is a diagram that defines the specification of detecting the disk shift in the embodiment;

FIG. 15 is a diagram illustrating the relation the track density has with the specification detecting the disk shift in the embodiment;

FIG. 16 is a diagram showing how $\Delta$SGI varies with the disk runout in the embodiment;

FIG. 17 is a diagram explaining how $\Delta$SGI shifts with temperature with respect to the disk runout in the embodiment;

FIG. 18 is a diagram explaining how the variation of ΔSGI is reduced through an averaging process in the embodiment;

FIG. 19 is a diagram explaining how ΔSGI reduces the temperature shift by using the SGI-temperature table according to the embodiment;

FIG. 20 is a diagram explaining how the track density at which the disk shift can be detected from SGI in the embodiment;

FIG. 21 is a diagram showing how the SGI phase varies with respect to the disk runout according to the embodiment;

FIG. 22 is a diagram showing how the SGI phase shifts with temperature, with respect to the disk runout according to the embodiment;

FIG. 23 is a diagram explaining how the variation of the SGI phase is reduced through an averaging process in the embodiment;

FIG. 24 is a diagram explaining how the SGI-phase shift due to temperature changes is reduced by using an SGI-temperature table in the embodiment;

FIG. 25 is a diagram explaining how to increase the track density at which a disk shift can be detected in the embodiment; and FIG. 26 is a table explaining how to increase the track density at which to detect the disk shift, by applying SGI and SGI phase, in the embodiment.

DETAILED DESCRIPTION

Various embodiments according to the invention will be described hereinafter with reference to the accompanying drawings. In general, according to one embodiment of the invention, there is provided a disk drive that has the function of calculating a change in the servo interval in consideration of the temperature change, detecting a disk shift from the servo-interval change thus calculated, and updating disk-runout information in accordance with the disk shift thus detected. The disk-runout information is information that is used to adjust the offset in order to control the actuator, thereby to move the magnetic head at a target position. The disk shift is a distance by which the disk moves from its rotation center.

Configuration of the Disk Drive

Figure 1:
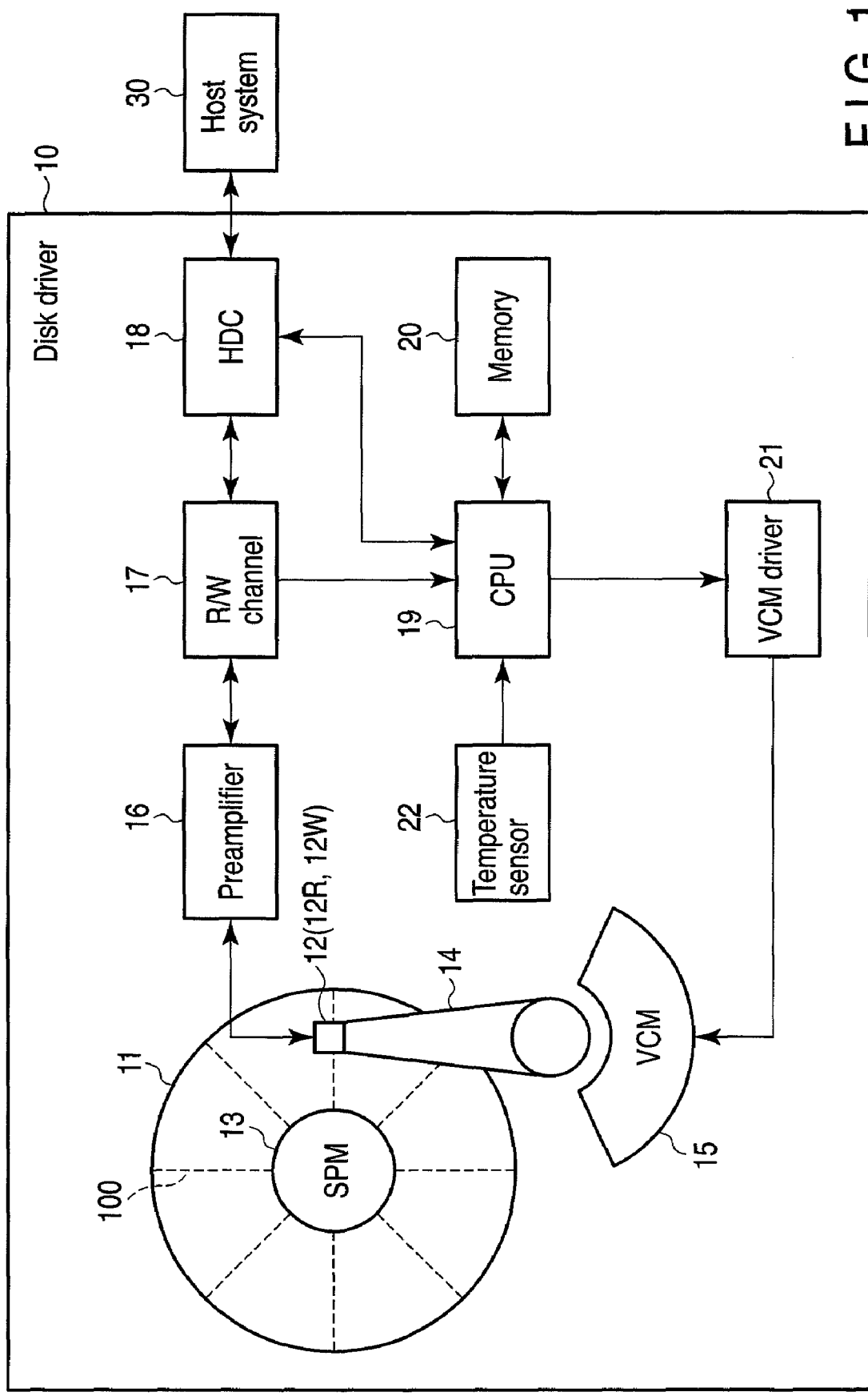
FIG. 1 is a block diagram showing a disk drive according to an embodiment of the present invention.

As FIG. 1 shows, a disk drive 10 according to this embodiment has a disk 11, a magnetic head 12, and a spindle motor (SPM) 13. The disk 11 is a magnetic recording medium. The SPM 13 rotates the disk 11.

The disk 11 has a plurality of servo areas 100 that extends in the radial direction of the disk 11 and are spaced apart in the circumferential direction of the disk 11. An address code and a servo data item are recorded in each servo area 100. The address codes identify recorded in the servo areas identify the concentric tracks (cylinders) provided on the disk 11. The servo data items include servo-burst patterns, respectively. From each servo-burst pattern, a position in one track can be detected. A microprocessor (CPU) 19, which will be described later, uses the servo data items in order to move the magnetic head 12 to a target position over the disk 11.

The magnetic head 12 is mounted on an actuator 14, which is driven by a voice coil motor (VCM) 15. The magnetic head 12 includes a read head 12R and a write head 12W. The read head 12R can read data (servo data and user data) from the disk 11. The write head 12W can write data in the disk 11. The VCM 15 is supplied with a drive current from a VCM driver 21 and is thereby controlled. The actuator 14 is a head-moving mechanism that is controlled and driven by the CPU 19. So controlled and driven, the actuator 14 moves the magnetic head 12 to a target position over the disk 11 (or to a target track or a target cylinder), thus positioning the magnetic head 12.

In addition to the head-disk assembly described above, the disk drive 10 has a preamplifier unit 16, a read/write (R/W) channel 17, a disk controller (HDC) 18, a CPU 19, a memory 20, and a temperature sensor 22. The preamplifier unit 16 has a read amplifier and a write driver. The read amplifier amplifies any read signal output from the read head 12R. The write driver supplies the write head 12W with a write signal that represents data to write in the disk 11.

The R/W channel 17 is a signal-processing unit configured to demodulate read data and modulate write data. The R/W channel 17 includes a servo decoder. The servo decoder is configured to reproduce servo data from a servo signal the read head 12R has read from the disk 11. The servo data contains an address code and a servo-burst value. The HDC 18 is an interface that connects the disk drive 10 to a host system 30. The HDC 18 controls the transfer of commands and read/write data. The host system 30 is, for example, a personal computer or a digital apparatus.

The CPU 19 is the main controller of the disk drive 10. The CPU 19 performs the process of detecting the disk shift, the process of updating the disk-runout information, and the positioning of the magnetic head 12 (including DOC operation). The memory 20 is a flash memory (EEPROM) that is a nonvolatile memory and stores table data and offset values, which will be described later. The disk drive 10 has a RAM and a ROM in addition to the memory 20. The RAM and the ROM stores data and programs the CPU 19 uses to perform various controls. The CPU 19 receives temperature data representing the temperature detected by the temperature sensor 22 and determines the temperature ambient to the disk 11.

ADVANTAGES OF THE EMBODIMENT

The advantages of the embodiment, mainly the advantage resulting from the updating of disk-runout information, will be described with reference to the flowcharts of FIGS. 6 to 8.

Figures 2, 3, 4:
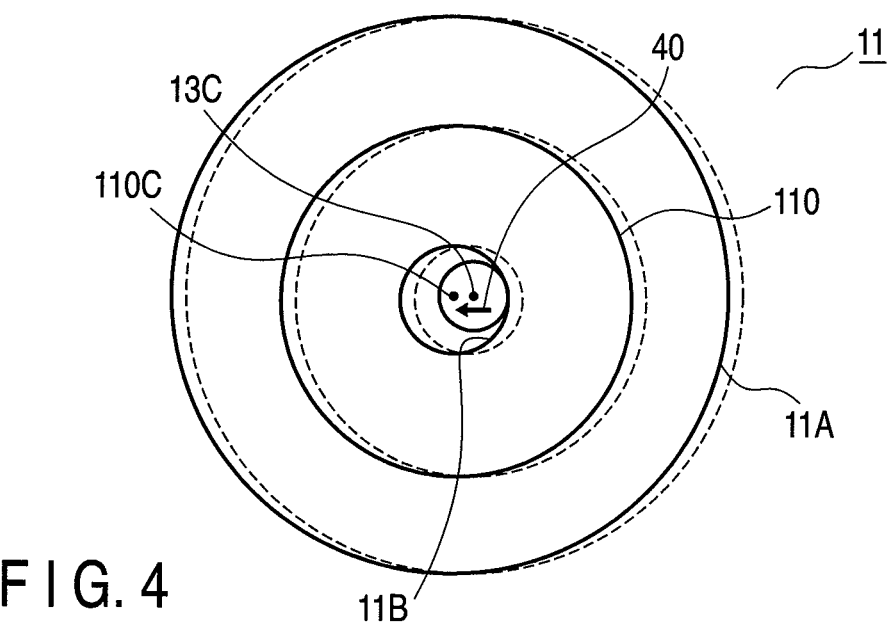
FIG. 2 is a diagram explaining an SGI-temperature table TBL1 used in the embodiment.
FIG. 3 is a diagram explaining the disk-runout table TBL2 used in the embodiment.
FIG. 4 is a diagram explaining a disk runout that develops in the embodiment.

As seen from FIG. 4, the "disk runout" is a positional deviation of the center 110C of the servo tracks, from the rotation center 13C of the SPM 13. The positional deviation shall be called disk runout 40. In FIG. 4, reference number 11A denotes the outer circumference of the disk 11, reference number 11B designates the inner circumference of the disk 11, and large and small broken-line circles indicate the loci two points on the outer and inner circumferences of the disk 11 draw, respectively, as the shaft of the SPM 13 rotates through 180°. The "center 110C of the servo tracks" means the center of the servo tracks, which are concentric and defined by the servo data written in the disk 11.

The disk drive 10 may receive an impact from outside after it has been shipped. In this case, a disk shift occurs, changing the position of the disk 11 secured to the SPM 13. As a result, the disk runout 11B (and disk phase) changes from the value measured during the manufacture of the disk drive 10. Therefore, on detecting the disk shift, the disk drive 10 according to this embodiment updates the disk-runout information stored in the memory 20 and representing the disk runout.

As FIG. 6 shows, the disk drive 10 is activated (Block 600). Then, the CPU 19 receives temperature data from the temperature sensor 22 and determines the temperature ambient to the disk 11 (Block 601). Next, the CPU 19 refers to an SGI-temperature table TBL1 stored in the memory 20 or recorded in the disk 11, acquiring the servo-interval change ΔSGI and SGI phase $P_{SGI}$, both corresponding to the temperature determined (Block 602).

The CPU 19 determines whether the servo-interval change ΔSGI acquired from the SGI-temperature table TBL1 has initial set value ΔSGIA$_{il}$ (Block 603). If the servo-interval change ΔSGI acquired from the SGI-temperature table TBL1 has initial set value ΔSGIA$_{il}$ (if YES in Block 603), the CPU 19 performs the process of calibrating a servo-interval change (SGI), which will be described later (S604). If the servo-interval change ΔSGI acquired from the SGI-temperature table TBL1 does not have the initial set value ΔSGIA$_{il}$ (if NO in Block 603), the CPU 19 performs the process of detecting the disk shift, which will be described later (Block 605).

FIG. 2 is a diagram explaining the SGI-temperature table TBL1 used in this embodiment. SGI (servo gate interval) is a change in the servo interval. The "servo-gate interval" is the time the read 12R travels from one servo area to the next one in the circumferential direction of the disk 11 to read servo data from any servo area 100 provided on the disk 11.

As FIG. 2 shows, the SGI-temperature table TBL1 stores various temperature ranges, various servo-interval changes ΔSGI corresponding to the various temperature ranges, and the phases P$_{SGI}$ of the respective servo-interval changes ΔSGI. The SGI-temperature table TBL1 is held in the memory 20 or in the disk 11. As will be described later, servo-interval changes ΔSGI and the phases thereof are used in the process of detecting the disk shift.

The servo-interval change ΔSGI is proportional to the disk runout. The servo-interval change ΔSGI does not deviate from the average value as long as the temperature remains unchanged. As has been confirmed, the servo-interval change ΔSGI and the phase P$_{SGI}$ deviates from the average value. Whether the servo-interval change ΔSGI measured and the phase P$_{SGI}$ thereof fall within a threshold range may be determined to detect a disk runout. If the servo-interval change ΔSGI and the phase P$_{SGI}$ deviate from the average values, a disk runout will be detected.

FIG. 3 is a diagram explaining the disk-runout table TBL2 used in the embodiment. As FIG. 3 shows, the disk-runout table TBL2 has disk-runout information constituted by disk runout E and disk-runout phase P$_E$. The disk-runout table TBL2 is stored in the memory 20.

FIG. 5 is a diagram explaining the servo interval (SGI) applied in the embodiment and the primary component of the servo interval. In FIG. 5, plotted on the abscissa axis is the position of the servo area (servo sector) for one track, and plotted on the ordinate axis is the servo interval (time).

As indicated above, the servo areas 100, in which servo data items are recorded, are arranged at regular intervals in each track in the circumferential direction of the disk 11. If the disk 11 has a disk runout, the servo interval 50 measured fluctuates while the disk 11 is rotating 360°, as is known in the art. The servo interval 50 measured is superposed with high-frequency noise due to the vibration of the disk 11, which is called non-repeatable runout (NRRO) and asynchronous with the rotation of the disk 11. Therefore, the waveform of the servo interval 50 is Fourier-transformed, extracting the primary component 51 of the servo interval. Thus, the components (servo-interval change ΔSGI and phase P$_{SGI}$) resulting from the disk runout can be extracted.

Figure 7:
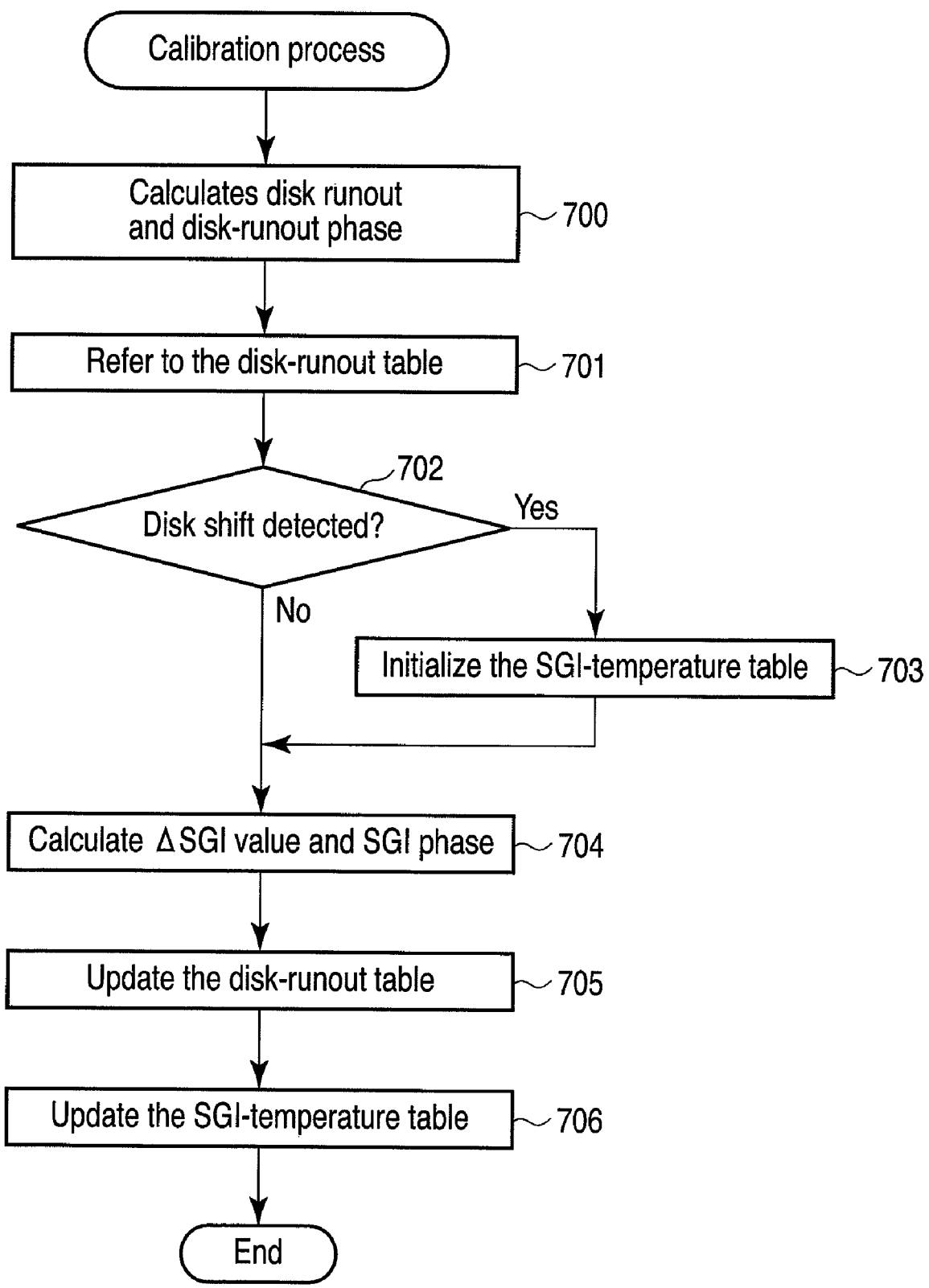
FIG. 7 is a flowchart explaining the sequence of calibrating SGI in the embodiment.

FIG. 7 is a flowchart explaining the process of calibrating SGI, which is Block 604 shown in FIG. 6.

The CPU 19 calculates the disk runout E and the disk-runout phase P$_E$, which constitute disk-runout information (Block 700). To be more specific, the CPU 19 causes the VCM driver 21 to drive the VCM 15. Thus driven, the VCM 15 moves the actuator 14 to a stopper (not shown), whereby the magnetic head 12 is positioned at the innermost track of the disk 11. The disk runout is thereby measured at the innermost track of the disk 11. The disk runout may be measured by any method other than this method of positioning the head 12 at the innermost track.

The CPU 19 then compares the disk-runout information obtained by measuring the disk runout, with the disk-runout information described in the disk-runout table TBL2 (Block 701). From the result of the comparison, the CPU 19 determines whether a disk shift has developed (Block 702).

If the disk-runout information obtained by measuring the disk runout differs from the disk-runout information described in the disk-runout table TBL2 (if YES in Block 702), the CPU 19 determines that a disk shift has developed and then initializes the SGI-temperature table (Block 703). In other words, the CPU 19 clears the information in the SGI-temperature table, i.e., various servo-interval changes ΔSGI and various phases P$_{SGI}$ thereof.

Next, the CPU 19 measures the servo intervals, generating SGI information consisting of new servo-interval changes ΔSGI and new various phases P$_{SGI}$ thereof (Block 704). The CPU 19 stores the new servo-interval changes ΔSGI and new various phases P$_{SGI}$ in the disk-runout table TBL2, thus updating the disk-runout information (Block 705). Further, the CPU 19 saves SGI information (i.e., servo-interval change ΔSGI and phase P$_{SGI}$) associated with the temperature detected at present, in the SGI-temperature table TBL1. The SGI-temperature table TBL1 is thereby updated (Block 706).

Figure 8:
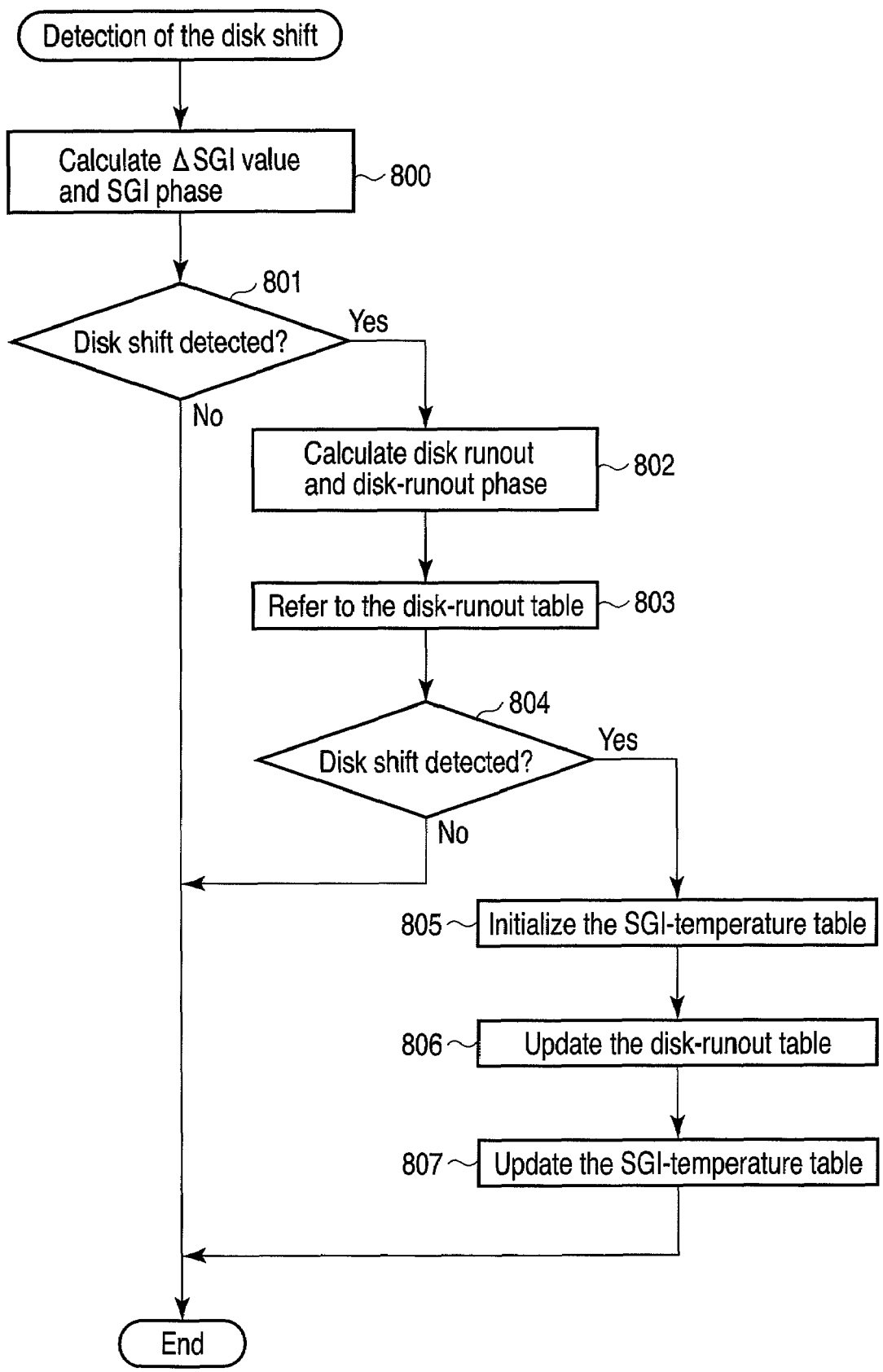
FIG. 8 is a flowchart explaining the sequence of detecting a disk shift in the embodiment.

FIG. 8 is a flowchart explaining the process of detecting a disk shift, which is Block 605 shown in FIG. 6.

First, the CPU 19 measures the servo intervals, generating SGI information consisting of servo-interval changes ΔSGI and various phases P$_{SGI}$ thereof (Block 800). The CPU 19 then acquires, from the SGI-temperature table TBL1, the SGI information that is associated with the temperature detected at present. The CPU 19 compares the SGI information with the SGI information it has just generated. From the result of the comparison, the CPU 19 determines whether a disk shift has developed (Block 801).

More precisely, the CPU 19 determines whether the difference between the SGI information and the SGI information it has just generated is greater than a prescribed threshold value. If the difference is greater than the prescribed threshold value (if YES in Block 801), the CPU 19 determines that a disk shift has developed. In this case, the CPU 19 calculates the disk runout E and the disk-runout phase P$_E$, both contained in the disk-runout information by positioning the magnetic head 12 at the innermost track of the disk 11 (Block 802). Further, the CPU 19 refers to the disk-runout table TBL2, comparing the disk runout calculated with the disk runout described in the disk-runout table TBL2 (Block 803). From the result of this comparison, the CPU 19 determines whether a disk shift has developed (Block 804). This process prevents a disk-shift detection error, which may be made if correct SGI information has not been acquired.

From the disk-runout information, the CPU 19 may determine that a disk shift has developed. In this case, the CPU 19 initializes the SGI-temperature table TBL1 (Block 805). That is, the CPU 19 clears the information in the SGI-temperature table TBL1 stored in the memory 20, i.e., various servo-interval changes ΔSGI and various phases P$_{SGI}$ thereof.

Next, the CPU 19 saves, in the disk-runout table TBL2, the disk-runout information (i.e., disk-runout change E and the disk-runout phase PE) calculated (Block 806). Further, the CPU 19 saves, in the SGI-temperature table TBL1, the SGI information (i.e., servo-interval change ΔSGI and phase P$_{SGI}$ thereof) calculated from the servo interval measured, as SGI information associated with the temperature detected at present (Block 807).

As described above, the disk drive 10 according this embodiment can detect the disk shift, not influenced by temperature changes. The disk shift detected is therefore accurate. The disk drive 10 can update the disk-runout information that is compensated for temperature. As a result, correct disk-runout information can be generated and saved at all times. Using the correct disk-runout information, the disk drive 10 can perform the dynamic offset control (DOC) reliably.

The disk-runout information must be updated every time a disk shift occurs when the disk drive 10 receives an impact while operating. The disk shift can be accurately determined from the SGI information, which is compensated for the temperature change.

SPECIFIC ADVANTAGES OF THE EMBODIMENT

FIGS. 9 and 10 are diagrams explaining the results obtained when the disk-rotation component is removed from the servo interval applied by a method different from the method employed in the present embodiment. More precisely, FIGS. 9 and 10 explain the amplitude and phase of the waveform of a difference between the servo intervals actually measured.

FIG. 9 is a diagram showing the characteristic 90 of a disk drive and the characteristic 91 of a disk drive, the disk drives having the same disk runout of 10 μm, and showing the amplitude of the waveform of a difference between the track address (radium) measured at the innermost track of the disk 11 and the servo interval actually measured, in terms of the disk runout. FIG. 10 is a diagram showing the characteristics 92 and 93 of two disk drives of similar type, and showing the phase of the waveform of a difference between the track address and the servo interval, both actually measured.

As evident from FIGS. 9 and 10, the amplitude of the differential waveform is at most 5 μm at the innermost track in one disk drive, and at most 3 μm at an inner track in the other disk drive. That is, the amplitude of the differential waveform in either disk drive changes with the distance from the center of the disk 11 in the radial direction of the disk 11. If the differential waveform results from the fluctuation of rotation, the amplitude and phase of the differential waveform will not depend on the distance from the center of the disk 11. However, the amplitude and phase of the differential waveform depended on amplitude and phase of the differential waveform. This means that the fluctuation of rotation could not be removed as desired.

In the method employed in the present embodiment, such specific advantages as shown in FIG. 11 to FIG. 26 can be obtained.

A specific example is based on the assumption that the disk drive incorporates a 1.8-inch disk and has the DOC function of controlling the dynamic offset (DO) value. The DO value at any track is greater than at the immediately outer track. The DO value is large in a disk drive having a 0.85-inch disk, because the diameter of the disk is relatively small. The DO value is 54 nm if the disk runout is 40 μm at the innermost track. In this case, the influence of the DO (dynamic offset) is not conspicuous if the track density of 110 ktpi. If the track density is high (e.g., 165 ktpi), however, the DO will deviate the read head from the data track, making many sector errors. This is why the disk drive incorporates a disk having track density of 165 ktpi and has the DOC function.

Figure 11:
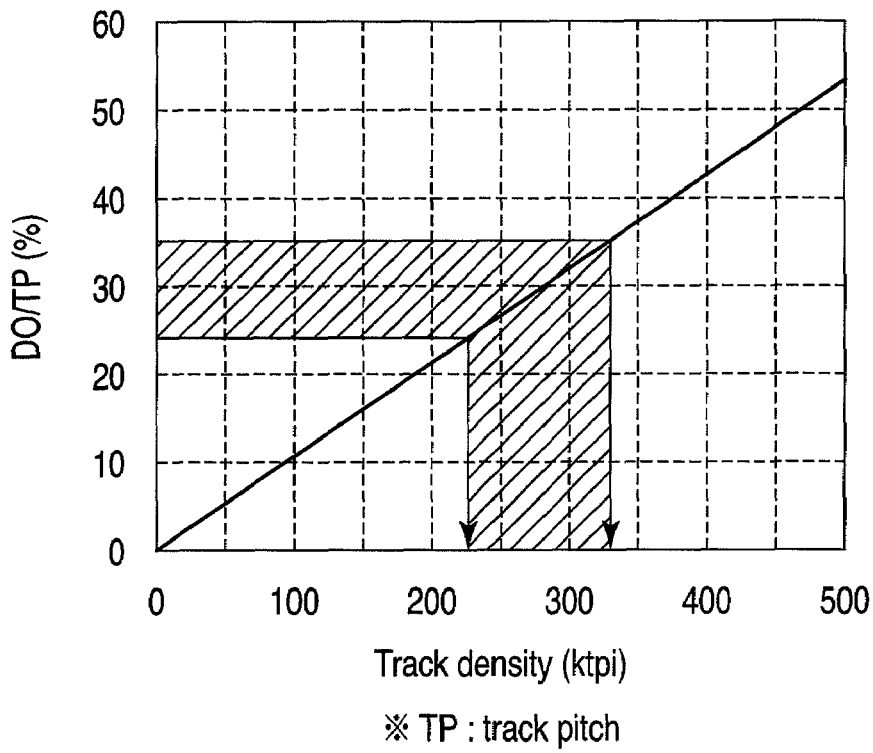
FIG. 11 is a diagram showing the ratio of the DO value to the track pitch, which is observed in the embodiment.

FIG. 11 is a diagram showing the ratio (DO/TP) of the DO value to the track pitch (TP). As FIG. 11 shows, the hither the track density, the smaller the track pitch will be, and the larger the ratio DO/TP will be. The DO/TP ratio is 24% at track pitch of 110 ktpi, and 36% at track pitch of 165 ktpi. If the DO/TP ratio ranges from 24% to 36%, the DOC function is indispensable.

Figure 12:
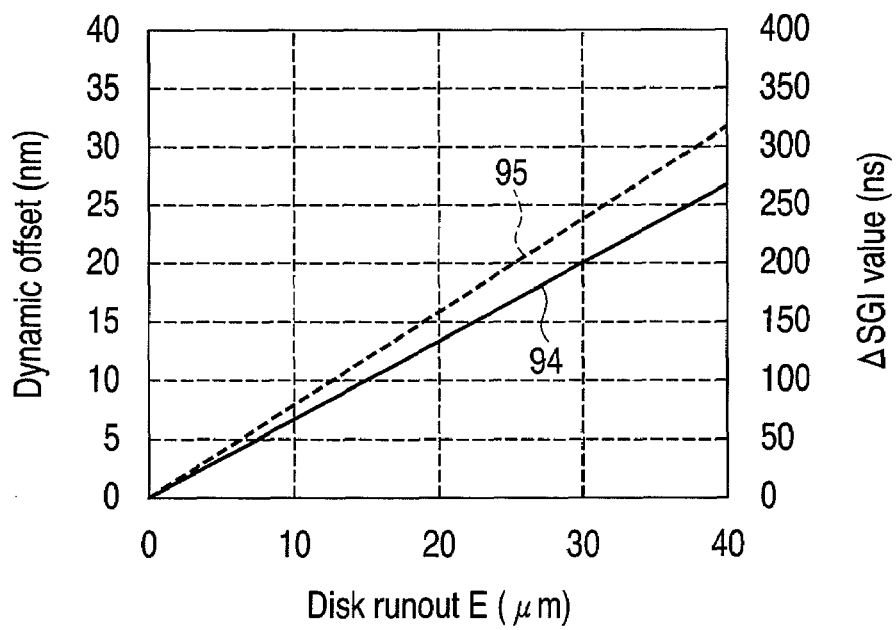
FIG. 12 is a diagram representing the relation that the DO value and the $\Delta$SGI value have in the embodiment.

FIG. 12 is a diagram representing the relation that the DO value 94 and the ΔSGI value 95 have with the disk runout E. As FIG. 12 shows, the DO value and the ΔSGI value increases in proportion to the disk runout E.

FIG. 13 is a diagram representing the relation that the tolerant disk-runout error 96 and tolerant ΔSGI error 97 have with the track density. FIG. 13 is based on the assumption that the dynamic offset (DO) resulting from the disk runout is 5% or less of the track density. As seen from FIG. 13, the disk-runout level and ΔSGI level, which should be detected because of the high track density, are relatively low.

FIG. 14 is a diagram that defines the specification of detecting the disk shift. The disk shift is detected by using the servo-interval change ΔSGI and servo-interval phase $P_{SGI}$ as parameter X. If the parameter X falls outside the range between the upper limit USL and the lower limit LSL, a disk shift is determined to have developed. Both the upper limit USL and the lower limit LSL are set to half the tolerant ΔSGI error and can serve as detection level of 4.5σ. The error of detecting the disk shift is four to million, as has been statistically confirmed.

FIG. 15 is a diagram illustrating the relation the track density has with the upper limit USL set in the specification of detecting the disk shift. In FIG. 15, the upper limit USL is given in terms of servo-interval change ΔSGI. As shown in FIG. 15, the upper limit USL decreases as the track density increases. Thus, the range from the lower limit LSL to the upper limit USL is narrow at high track densities.

FIG. 16 is a diagram showing how the servo-interval change ΔSGI varied with the disk runout E when the temperature ambient to the disk drive was 0° C., 30° C. and 60° C. As seen from FIG. 16, the servo-interval change ΔSGI varied, not depending on the disk runout, and the standard deviation of ΔSGI was 12 ns or less.

FIG. 17 is a diagram explaining how ΔSGI shifted with temperature with respect to the disk runout E when the temperature ambient to the disk drive was 0° C. and 60° C. As seen from FIG. 17, the average of ΔSGI shifted by 20 ns at most.

FIG. 18 is a diagram explaining how the variation of the servo-interval change ΔSGI was reduced through an averaging process. In this instance, the servo-interval waveforms obtained for 100 times were averaged, thereby calculating ΔSGI for the averaged servo-interval waveform. As seen FIG. 18, the standard deviation a of ΔSGI, which was 12 ns at most, decreased to 1 ns or less, by virtue of the averaging process.

FIG. 19 is a diagram explaining how ΔSGI reduces the temperature shift by using the SGI-temperature table. As FIG. 19 shows, the average of ΔSGI was shifted to 20 ns at most by a temperature change of 60° C., but was reduced to 5 ns or less by applying the SGI-temperature table TBL1. The value of "5 ns or less" falls within the range of measuring variation.

FIG. 20 is a diagram explaining how the track density at which the disk shift can be detected from ΔSGI. Note that the track density at which the disk shift can be detected is the highest track density at which the sum of the ΔSGI shift from USL resulting from temperature change and the value 4.5σ (i.e., detection level) is the smallest.

When the measuring was performed once and the SGI-temperature table was not applied, a disk-shift detection ability of 100 ktpi (default 200) was obtained. When the servo-interval waveforms obtained for 100 times were averaged, the standard deviation of ΔSGI decreased, resulting in a disk-shift detection ability of 300 ktpi (201). Further, when the SGI-temperature table was applied, a disk-shift detection ability of 1700 ktpi (202) was attained.

FIG. 21 is a diagram showing how the SGI phase varies with the disk runout E. As seen from FIG. 21, the smaller the disk runout E, the more the SGI phase increased.

FIG. 22 is a diagram showing how the SGI phase shifts with respect to the disk runout when the temperature changes to 60° C. As FIG. 22 shows, the SGI phase shifted at temperature of 60° C. in the same way as the servo-interval change ΔSGI shifted.

FIG. 23 is a diagram explaining how the variation of the SGI phase is reduced through the averaging process. The SGI phases obtained for 100 times were averaged. The SGI-phase variation (211) achieved by this averaging process was about one-tenth (1/10) of the SGI-phase variation (210) observed when no averaging process was performed.

FIG. 24 is a diagram explaining how the SGI-phase shift resulting from temperature changes is reduced by using the SGI-temperature table. As seen from FIG. 24, the use of the SGI-temperature table reduced the SGI-phase shift to about one-fifth. Note that the variation of the SGI-phase shift fell within the range of measuring variation, owning to the use of the SGI-temperature table.

FIG. 25 is a diagram explaining how to increase the track density at which a disk shift can be detected. The amplitude of the differential waveform between the basic waveform and the waveform resulting from a phase shift is calculated, thereby converting the phase component to an amplitude component.

The track density at which a disk shift can be detected is the highest track density at which the sum of the ΔSGI shift from USL, due to temperature change, and the value of 4.5σ is the smallest. When the disk runout was small, the value measured greatly varied and the sum of the ΔSGI shift and the value of 4.5σ increased. In FIG. 25, the broken lines indicate values at the disk runout of 40 μm or less. Let us compare USL with the sum of the SGI-phase shift from USL (due to temperature change) and the value of 4.5σ. Obviously, the sum of the SGI-phase shift from USL and the value of 4.5σ does not surpass USL as is desired. This is why the highest track density at which the disk shift can be detected is determined.

When the measuring was performed once and the SGI-temperature table was not applied, a disk-shift detection ability of 120 ktpi (default 220) was obtained. When the servo-interval waveforms obtained for 100 times were averaged, the standard deviation of ΔSGI decreased, resulting in a disk-shift detection ability of 245 ktpi (221). Further, when the SGI-temperature table was applied, a disk-shift detection ability of 490 ktpi (222) was attained.

FIG. 26 is a table explaining how to increase the track density at which to detect the disk shift, by applying SGI and SGI phase. In the normal operation of the disk drive, it is necessary to detect the disk shift in both the radial direction and the rotation direction. Hence, the disk shift is detected at a relatively low track density at which to detect the amplitude and at a relatively low track density at which to detect the phase. In view of this, the highest track density at which the disk shift can be detected is 100 ktpi (default) if the method according to this embodiment is not employed. If the servo-interval waveform is averaged as in the present embodiment, the highest track density at which the disk shift can be detected is 245 ktpi. If the SGI-temperature table according to the embodiment is applied, the highest track density at which the disk shift can be detected is 490 ktpi. In other words, the use of the SGI-temperature table according to the embodiment increases the track density at which the disk shift can be detected to as high as 490 ktpi.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a disk configured to be rotated by a spindle motor and comprising a plurality of servo data items recorded and spaced at predetermined intervals in a circumferential direction;
a magnetic head configured to read data from the disk and to write data from the disk;
an actuator configured to move the magnetic head in a radial direction of the disk;
a temperature sensor configured to detect a temperature ambient to the disk;
a disk-runout measuring module configured to measure a disk runout of the disk;
a storage module configured to store disk-runout information representing the disk runout as information which is used for offset adjustment when the actuator is controlled and the magnetic head is positioned;
a servo-interval measuring module configured to measure servo intervals, each being a time interval between two adjacent servo data items;
a disk-shift detecting module configured to detect a disk shift of the disk based on the temperature detected by the temperature sensor and servo-interval information representing a change of the servo interval; and
an updating module configured to cause the disk-runout measuring module to measure a disk runout and to update the disk runout information stored in the storage module in accordance with the disk runout which the disk-runout measuring module measures when the disk-shift detecting module detects the disk shift of the disk.

2. The disk drive of claim 1, further comprising a servo-interval change table storing servo-interval data items, each consisting of a temperature value and a servo-interval change associated with the temperature value,
wherein the disk-shift detecting module is configured to detect the disk shift based on the servo-interval information acquired from the servo-interval change table, the temperature detected by the temperature sensor and the servo interval measured by the servo-interval measuring module.

3. The disk drive of claim 2, wherein the servo-interval information comprises a servo-interval change corresponding to the temperature value and a phase of the servo interval.

4. The disk drive of claim 3, further comprising:
a calibration process module configured to compare the disk-runout information stored in the storage module with the disk-runout information calculated from the disk-runout measured by the disk-runout measuring module, thereby detecting the disk shift; and
a servo-interval information updating module configured to update the servo-interval information stored in the servo-interval change table and corresponding to the temperature detected by the temperature sensor when the calibration process module detects the disk shift.

5. The disk drive of claim 3, further comprising a re-detection module configured to compare the disk-runout information stored in the storage module with the disk-runout information calculated from the disk runout measured by the disk-runout measuring module when the disk-shift detecting unit detects the disk shift, and to determine that the disk shift has been detected when the disk-runout information stored in the storage module differs from the disk-runout information calculated from the disk runout,
   wherein the information updating module is configured to update the disk-runout information when the re-detection module determines that the disk shift has been detected.

6. The disk drive of claim 3, further comprising a servo-interval information updating module configured to update the servo-interval information stored in the servo-interval change table and corresponding to the temperature detected by the temperature sensor when the disk-shift detecting module detects the disk shift.

7. The disk drive of claim 2, further comprising:
   a calibration process module configured to compare the disk-runout information stored in the storage module with the disk-runout information calculated from the disk-runout measured by the disk-runout measuring module, thereby detecting the disk shift; and
   a servo-interval information updating module configured to update the servo-interval information stored in the servo-interval change table and corresponding to the temperature detected by the temperature sensor when the calibration process module detects the disk shift.

8. The disk drive of claim 7, wherein the servo-interval information updating module is configured to initialize the servo-interval change table, and to update the servo-interval information by storing the servo-interval information calculated from the servo interval measured by the servo-interval measuring module in the servo-interval change table as servo-interval information that corresponds to the temperature detected by the temperature sensor.

9. The disk drive of claim 8, further comprising a re-detection module configured to compare the disk-runout information stored in the storage module with the disk-runout information calculated from the disk runout measured by the disk-runout measuring module when the disk-shift detecting unit detects the disk shift, and to determine that the disk shift has been detected when the disk-runout information stored in the storage module differs from the disk-runout information calculated from the disk runout,
   wherein the information updating module is configured to update the disk-runout information when the re-detection module determines that the disk shift has been detected.

10. The disk drive of claim 7, further comprising a re-detection module configured to compare the disk-runout information stored in the storage module with the disk-runout information calculated from the disk runout measured by the disk-runout measuring module when the disk-shift detecting unit detects the disk shift, and to determine that the disk shift has been detected when the disk-runout information stored in the storage module differs from the disk-runout information calculated from the disk runout,
   wherein the information updating module is configured to update the disk-runout information when the re-detection module determines that the disk shift has been detected.

11. The disk drive of claim 2, further comprising a re-detection module configured to compare the disk-runout information stored in the storage module with the disk-runout information calculated from the disk runout measured by the disk-runout measuring module when the disk-shift detecting unit detects the disk shift, and to determine that the disk shift has been detected when the disk-runout information stored in the storage module differs from the disk-runout information calculated from the disk runout,
   wherein the information updating module is configured to update the disk-runout information when the re-detection module determines that the disk shift has been detected.

12. The disk drive of claim 2, further comprising a servo-interval information updating module configured to update the servo-interval information stored in the servo-interval change table and corresponding to the temperature detected by the temperature sensor when the disk-shift detecting module detects the disk shift.

13. The disk drive of claim 12, further comprising a re-detection module configured to compare the disk-runout information stored in the storage module with the disk-runout information calculated from the disk runout measured by the disk-runout measuring module when the disk-shift detecting module detects the disk shift, and to determine that the disk shift has been detected when the disk-runout information stored in the storage module differs from the disk-runout information calculated from the disk runout,
   wherein the servo-interval information updating module updates the servo-interval information when the re-detection module detects the disk shift.

14. The disk drive of claim 12, wherein the servo-interval information updating module is configured to initialize the servo-interval change table, and to update the servo-interval information by storing the servo-interval information calculated from the servo interval measured by the servo-interval measuring module in the servo-interval change table as servo-interval information that corresponds to the temperature detected by the temperature sensor.

15. The disk drive of claim 12, wherein the servo-interval information updating module is configured to initialize the servo-interval change table, and to update the servo-interval information by storing the servo-interval information calculated from the servo interval measured by the servo-interval measuring module in the servo-interval change table as servo-interval information that corresponds to the temperature detected by the temperature sensor.

16. The disk drive of claim 1, further comprising a re-detection module configured to compare the disk-runout information stored in the storage module with the disk-runout information calculated from the disk runout measured by the disk-runout measuring module when the disk-shift detecting module detects the disk shift, and to determine that the disk shift has been detected when the disk-runout information stored in the storage module differs from the disk-runout information calculated from the disk runout,
   wherein the information updating module is configured to update the disk-runout information when the re-detection module determines that the disk shift has been detected.

17. A method of updating disk-runout information, for use in a disk drive having a disk configured to be rotated by a spindle motor and comprising a plurality of servo data items recorded and spaced at predetermined intervals in a circumferential direction; a magnetic head configured to read data from the disk and to write data from the disk; an actuator configured to move the magnetic head in a radial direction of the disk; and a storage module configured to store disk-runout information representing a disk runout, as information for adjusting an offset when the actuator is controlled to move the magnetic head, the method comprising:

detecting a temperature ambient to the disk;

measuring a disk-runout of the disk;

measuring servo intervals, each being a time interval between two adjacent servo data items detecting a disk shift of the disk based on the temperature detected and servo-interval information representing a change of the servo interval; and updating the disk-runout information stored in the storage module in accordance with the disk runout measured when the disk shift of the disk is detected.

18. The method of claim 17, further comprising:

using a servo-interval change table storing servo-interval data items, each comprising a temperature value and a servo-interval change associated with the temperature value, wherein the disk shift is detected based on the servo-interval information acquired from the servo interval change table, the temperature detected by the temperature sensor and the servo interval measured by the servo-interval measuring module.

19. The method of claim 18, further comprising:

performing a calibration process to detect the disk shift by comparing the disk-runout information stored in the storage module with the disk-runout information calculated from the servo intervals measured; and updating the servo-interval information stored in the servo-interval change table and corresponding to the temperature detected, when the disk shift is detected in the calibration process.

20. The method of claim 18, further comprising:

comparing the disk-runout information stored in the storage module with the disk-runout information calculated from the disk runout measured when the disk shift is detected; and determining that the disk shift has been detected when the disk-runout information stored in the storage module differs from the disk-runout information calculated from the disk runout;

wherein the disk-runout information is updated when the disk shift is determined to have been detected.

21. The method of claim 17, further comprising:

performing a calibration process to detect the disk shift by comparing the disk-runout information stored in the storage module with the disk-runout information calculated from the servo intervals measured; and updating the servo-interval information stored in the servo-interval change table and corresponding to the temperature detected, when the disk shift is detected in the calibration process.

22. The method of claim 21, further comprising:

comparing the disk-runout information stored in the storage module with the disk-runout information calculated from the disk runout measured when the disk shift is detected; and determining that the disk shift has been detected when the disk-runout information stored in the storage module differs from the disk-runout information calculated from the disk runout;

wherein the disk-runout information is updated when the disk shift is determined to have been detected.

23. The method of claim 17, further comprising:

comparing the disk-runout information stored in the storage module with the disk-runout information calculated from the disk runout measured when the disk shift is detected; and determining that the disk shift has been detected when the disk-runout information stored in the storage module differs from the disk-runout information calculated from the disk runout;

wherein the disk-runout information is updated when the disk shift is determined to have been detected.

* * * * *